United States Patent [19]

Rattunde

[11] Patent Number: 5,279,525
[45] Date of Patent: Jan. 18, 1994

[54] CONE DISC TRANSMISSION, PARTICULARLY FOR MOTOR VEHICLES

[75] Inventor: Manfred Rattunde, Bad Homburg, Fed. Rep. of Germany

[73] Assignee: Reimers Getriebe AG, Zug, Switzerland

[21] Appl. No.: 14,175

[22] Filed: Feb. 5, 1993

[30] Foreign Application Priority Data

Feb. 6, 1992 [DE] Fed. Rep. of Germany ....... 4203362

[51] Int. Cl.$^5$ .............................................. F16H 63/00
[52] U.S. Cl. ........................................ 474/69; 474/28
[58] Field of Search .................. 474/8, 11, 12, 17, 18, 474/28, 69, 70; 74/868, 867

[56] References Cited

U.S. PATENT DOCUMENTS

| | | |
|---|---|---|
| 4,261,213 | 4/1981 | Rattunde . |
| 4,846,765 | 7/1989 | Sakai ................................... 474/28 |
| 4,942,786 | 7/1990 | Dittrich . |
| 5,045,028 | 9/1991 | Rattunde et al. . |
| 5,046,991 | 9/1991 | Friedmann ........................ 474/28 X |
| 5,088,352 | 2/1992 | Ishimaru ................................ 74/867 |

FOREIGN PATENT DOCUMENTS

| | | |
|---|---|---|
| 2946295 | 10/1982 | Fed. Rep. of Germany . |
| 3310786 | 9/1984 | Fed. Rep. of Germany . |
| 3504763 | 10/1985 | Fed. Rep. of Germany . |
| 3743195 | 2/1989 | Fed. Rep. of Germany . |

*Primary Examiner*—Thuy M. Bui
*Attorney, Agent, or Firm*—Spencer, Frank & Schneider

[57] ABSTRACT

An infinitely variable cone disc transmission is disclosed in which the contact pressure forces are generated fully hydraulically and in which the contact pressure level is set either by way of a torque sensor that is disposed on the driven shaft and constitutes a pressure medium throttle that is adjustable as a function of the load and the transmission ratio, or by way of a pressurizing valve that is connected in series with this torque sensor and controlled as a function of the load.

9 Claims, 2 Drawing Sheets

CONE DISC TRANSMISSION, PARTICULARLY FOR MOTOR VEHICLES

CROSS REFERENCE TO RELATED APPLICATION

This application claims the priority of application Ser. No. P 42 03 362.4-12, filed Feb. 6th, 1992, in the Federal Republic of Germany, the subject matter of Which is incorporated herein by reference.

BACKGROUND OF THE INVENTION

The present invention relates to an infinitely adjustable cone disc transmission including two pairs of cone discs arranged on the driving and driven shafts as well as a transfer means rotating between the pairs of discs, with the cone discs being fixed to rotate with the shaft carrying them. On each shaft one cone disc is also axially fixed while the associated second cone disc is configured as an axially displaceable component of a cylinder-piston unit that is fixed to the shaft and to which pressure medium is supplied through an inlet from a four-edged spool valve. The latter is adjustable by means of an adjustment member and, in order to press on the transfer means and to set and maintain the transmission ratio, is provided with an outlet for the outgoing pressure medium. A discharge conduit is connected to the pressure medium outlet, with at least one torque sensor being disposed therein. This torque sensor is arranged on one of the transmission shafts in the flow of moments at that location and influences, as a function of the load, the pressure medium pressure in the cylinder-piston units. The torque sensor is hydraulically connected in series with an adjustable pressurizing valve with which the pressure medium pressure can be additionally influenced.

Such a transmission is disclosed, for example, in German Patent 3,743,195. In that patent, a torque sensor disposed on the driving side is hydraulically followed by a pressurizing valve that additionally influences the pressure medium pressure exclusively as a function of the transmission ratio of the power train in such a way that, with an increasing transmission ratio of driving revolutions to driven revolutions, this pressure increases as well.

This pressure medium pressure is furnished by a pump, with the energy consumption of this pump for a constant conveyed stream being approximately proportional to the pressure medium pressure that it must furnish. Since the energy to be expended for operation of the pump and the friction losses as a function of contact pressure in the drive loop have a negative influence on the overall efficiency of the transmission, it is desirable to keep the pressure level as low as possible in dependence on the load state. This is relevant particularly under partial load, that is, in connection with motor vehicles, particularly in city traffic.

However, in the transmission described in German Patent 3,743,195, the result is that the pressure medium pressure may possibly be kept very high even if the load applied to the transmission is small, because the pressurizing valve operates purely as a function of the transmission ratio, particularly if the load is small but the transmission ratio is high at the same time.

SUMMARY OF THE INVENTION

It is therefore an object of the present invention to provide a cone disc transmission of the above-mentioned type in which, under a small load on the transmission, the pressurizing valve does not hold the pressure medium pressure at an unnecessarily high pressure level.

This is accomplished by the present invention in a transmission of the above-described type in that the torque sensor is disposed on the driven shaft and the pressurizing valve is controlled in dependence on the load applied to the transmission in such a way that it throttles the pressure medium discharge to a greater extent if the load is greater than if it is smaller.

The advantages resulting from this arrangement as a whole are that, if the load on the transmission is small, the basic pressure in the hydraulic system which influences the efficiency of the transmission under partial load can be kept very low and the energy consumed by the pump is not unnecessarily high.

Moreover, the contact pressure forces between the pairs of cone discs and the transfer means, which are necessary for a reliable, slip-free torque transmission between the drive shaft and the driven shaft also remain at a low level so that low friction losses result.

At the same time, the arrangement of the torque sensor on the driven shaft ensures that the pressure medium pressure is controlled not only purely as a function of the load but also as a function of the transmission ratio.

In a structurally preferred solution, the pressurizing valve hydraulically precedes the torque sensor so that the pressure medium is able to flow out of the torque sensor without pressure and need not first be conducted from the rotating torque sensor into the stationary conduit to the pressurizing valve by means of a connection that is complicated to manufacture.

From an operational point of view it is advantageous to effect the adjustment of the pressuring valve against a resistance that is connected with the pressurizing valve. This resistance permits a greater adjustment speed for the pressurizing valve in the case of an increase in the load than for a decrease in the load. This provides for greater safety against the transfer means slipping through at the pairs of cone discs.

One embodiment of this resistance is composed of a cylinder-piston unit whose movable component is rigidly connected with the pressurizing valve and which has a chamber filled with pressure medium the volume of which is reduced when the load increases. In that case, a check valve opens and causes pressure medium to be emptied through a fixed throttle. The pressure medium volume is enlarged if the load drops in that it flows in only through the fixed throttle. The fact that the emptying and filling of this chamber takes place against the pressure medium pressure existing at the outlet of the four-edged spool valve, makes it possible to adapt the response behavior of the pressuring valve to the load state of the cone disc transmission.

One way of effecting the load dependent control of the pressurizing valve is to adjust the latter by way of a cam mechanism which is connected with the gas pedal of an internal-combustion engine acting as the drive.

A more favorable way, however, is to control the pressurizing valve by means of an electronic control unit which generates a control instruction from data determined by means of sensors disposed in the internal-combustion engine acting as the drive and from other data derived from the vehicle.

This electronic control unit may also be a component of a central electronic system provided in the vehicle.

The electronic control unit of the pressurizing valve may include a proportional valve which determines the hydraulic pressure required to actuate the pressuring valve.

In order to realize a particularly fast response of the transmission to an increase in load, the torque sensor may be configured as a torque pump and bypass conduits to the control valves preceding the torque sensor may be disposed between the torque sensor and the cylinder-piston units, with these bypass conduits including check valves which cause pressure medium to flow from the torque sensor into the cylinder-piston units if there is a sudden increase in torque.

BRIEF DESCRIPTION OF THE DRAWINGS

Further advantages and features of the invention will become evident from the description below of embodiments thereof and from the drawing figures, in which.

DETAILED DESCRIPTION OF THE PREFERRED EMBODIMENT

Figure 1:
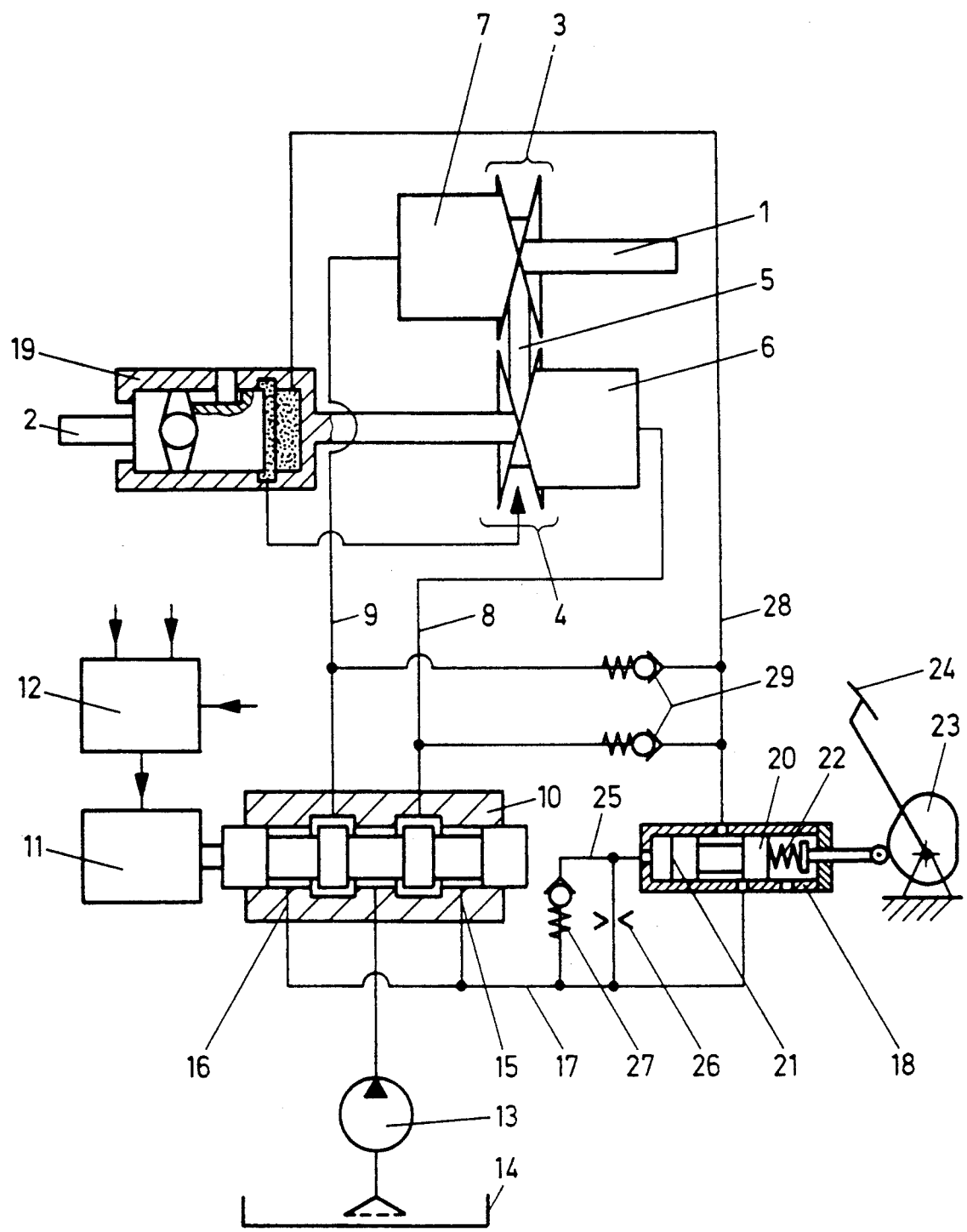
FIG. 1 is a schematic representation of a cone disc transmission according to the invention including a pressurizing valve that is controlled by way of a cam disc.

FIG. 1 is a schematic representation of a transmission which includes a drive shaft 1 and a driven shaft 2. Pairs of cone discs 3 and 4 are seated on these shafts, with a transfer means 5 rotating between them to effect the transmission of torque from drive shaft 1 to driven shaft 2. In each pair of cone discs 3 and 4, which are each fixed so as to rotate together with the shaft on which they are seated, one disc is also axially fixed while the associated second cone disc is configured as an axially displaceable component of a cylinder-piston unit 6 or 7, respectively, which is shown only schematically and is fixed to the shaft. By means of these cylinder-piston units, the transfer means is pressed on and the transmission ratio is set and maintained.

The pressure medium required for this purpose flows into cylinder-piston units 6 and 7 through pressure medium conduits 8 and 9. The quantities of pressure medium and its pressure are regulated by way of a four-edged spool valve 10 which can be adjusted by means of an adjustment member 11.

In the illustrated embodiment, this adjustment member 11 is a linear drive which is actuated by a microprocessor 12 that precedes it. The actuation may here be effected as a function of momentarily measured values for speed, transmission ratio, number of revolutions of the drive, etc.

The pressure medium supplied by four-edged spool valve 10 to the cylinder-piston units 6 and 7 is furnished by a pump 13 which obtains it from a sump 14.

After passing through the control gap in four-edged spool valve 10, the pressure medium employed to set and maintain the transmission ratio flows through outlets 15 and 16 into discharge conduit 17, through which it is conducted by way of a pressurizing valve 18 and a torque sensor 19 back into sump 14. The pressure medium may here also be employed to lubricate and cool transfer means 5 and the pairs of cone discs 3 and 4.

By way of the throttling effect of pressurizing valve 18 and torque sensor 19, the basic pressure in discharge conduit 17 is determined, which produces an effect, on the one hand, on the contact pressure force of cylinder-piston units 6 and 7 and, on the other hand, on the pressure medium pressure to be furnished by pump 13.

Pressurizing valve 18 includes a piston 20 which, on its one end face 21, is charged with the pressure of discharge conduit 17 and, on its opposite end face with the force of a spring 22.

The force of spring 22 is coupled by way of a cam mechanism 23 with the position of a gas pedal 24 of an internal-combustion engine and is thus dependent on the respective load state of the engine.

Piston 20 thus throttles the discharge of pressure medium from discharge conduit 17 in dependence on the load state present in the transmission and in this way keeps the pressure medium pressure proportional to the force of spring 22.

The quantity of pressure medium pushed out by end face 21 when there is an increase in the spring force flows through a conduit 25 back into discharge conduit 17, traversing a throttle 26 and a one-way valve 27. If the spring force decreases, this one-way valve 27 closes so that pressure medium flows into the chamber opened by end face 21 only through throttle 26.

In this way it is accomplished that, upon an increase in load, piston 20 permits the pressure medium pressure in conduit 17 to increase faster than it permits it to drop if there is a decrease in load.

The pressure existing in conduit 28 downstream of pressurizing valve 18 is determined by the torque sensor 19 seated on driven shaft 2. The torque sensor throttles the pressure existing in conduit 28 in dependence on the load absorbed by the transmission. Since torque sensor 19 is seated on driven shaft 2, the pressure in conduit 28 is dependent, on the one hand, on the load conducted to it as a whole by way of the power train and, on the other hand, particularly by the transmission ratio of the power train.

If torque sensor 19 determines a pressure in conduit 28 that is greater than the pressure medium pressure intended by pressurizing valve 18 for discharge conduit 17, pressurizing valve 18 has no effect and the pressure existing in discharge conduit 17 corresponds to the pressure in conduit 28. That is, the pressure medium pressure existing in discharge conduit 17 is always determined by the throttling element (pressuring valve 18 or torque sensor 19, respectively) following it which requires a greater pressure. For low transmission ratios this is pressurizing valve 18 and for high transmission ratios it is torque sensor 19.

In the illustrated embodiment, the torque sensor is configured as a so-called torque pump which prevents the outflow of pressure medium from conduit 28 if there is a sudden surge in torque and pushes a predetermined pressure medium volume back into this conduit. This pressure medium volume travels through check valves 29 into pressure medium conduits 8 and 9 where it causes a sudden increase in pressure in cylinder-piston units 6 and 7. Due to the thus effected rapid rise in pressure, the contact pressure force of the pairs of cone discs against the transfer means is increased in the shortest time and prevents the transmission from slipping through because of the surge in torque.

Figure 2:
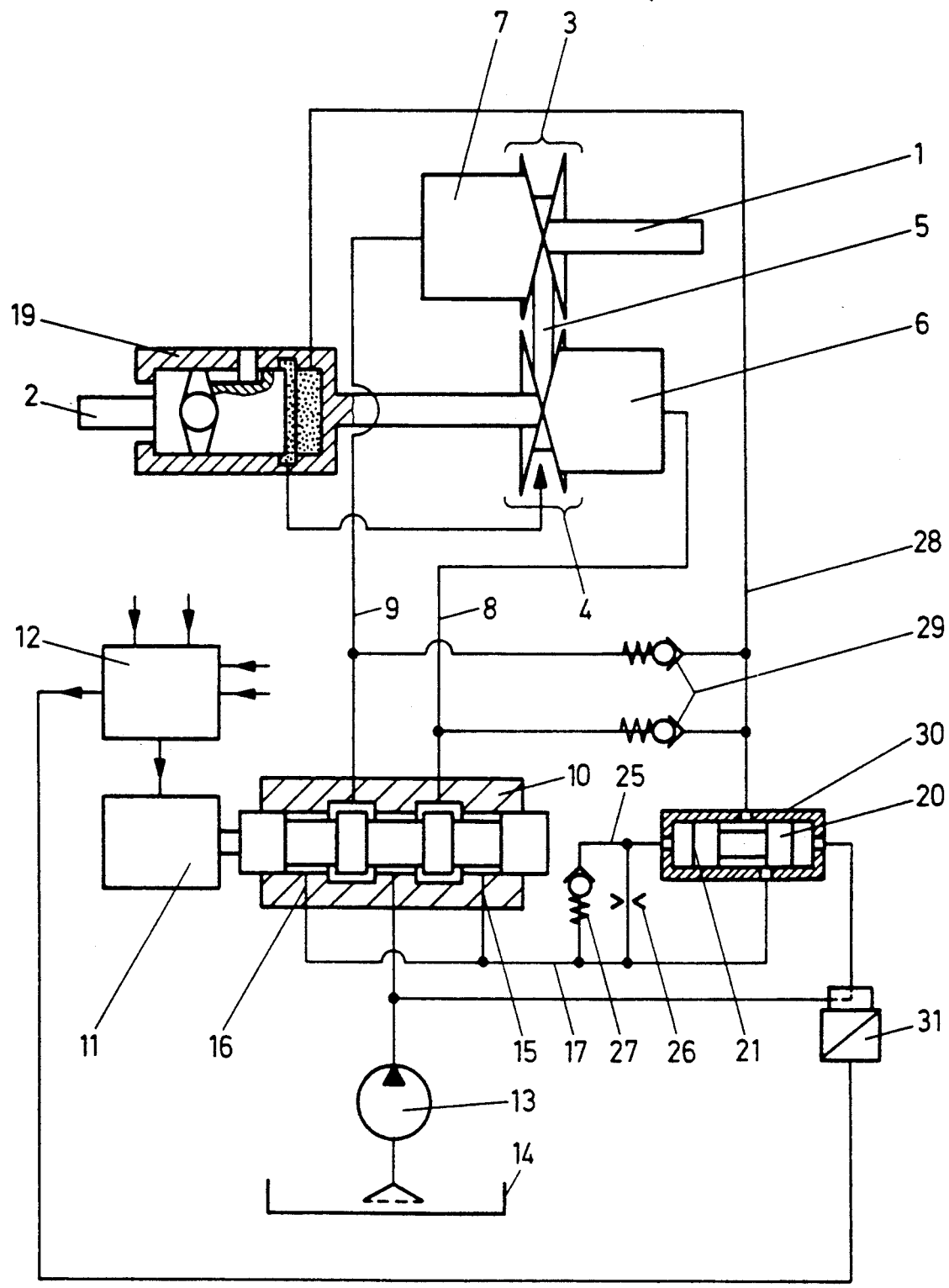
FIG. 2 depicts a cone disc transmission according to the invention that is equipped with a preliminary electronic control of the pressurizing valve.

The cone disc transmission shown in FIG. 2 essentially corresponds to the transmission shown in FIG. 1 but here pressurizing valve 30 is controlled by a proportional valve 31 which reduces the pressure coming from pump 13 in a controlled manner to the pressure required for regulating pressurizing valve 30.

The proportional valve 31 is here also controlled by microprocessor 12.

This arrangement permits an even more precise adjustment of the pressure medium pressure existing in discharge conduit 17 to the momentary load state of the transmission.

In summary, the present invention provides a favorable possibility to provide pressure regulation according to requirements in a cone disc transmission of the above-mentioned type.

It will be understood that the above description of the present invention is susceptible to various modifications, changes and adaptations, and the same are intended to be comprehended within the meaning and range of equivalents of the appended claims.

What is claimed is:

1. An infinitely adjustable cone disc transmission including two pairs of cone discs that are disposed on the drive shaft and on the driven shaft as well as a transfer means rotating between them, wherein the cone discs are connected so as to rotate with the shaft supporting them, with one cone disc also being axially fixed on each shaft while the associated second cone disc is configured as an axially displaceable component of a cylinder-piston unit that is fixed to the shaft and receives pressure medium through an inlet from a four-edged spool valve so as to press on the transfer means and to adjust and maintain the transmission ratio, the spool valve being adjustable by means of an adjustment member and being provided with an outlet for the transported pressure medium; the outlet is connected to a discharge conduit which includes at least one torque sensor that is disposed on one of the drive shafts within the flow of moments at that location so as to influence the pressure medium pressure in the cylinder-piston units in dependence on the load, the torque sensor being hydraulically connected in series with an adjustable pressurizing valve with which the pressure medium pressure can be additionally influenced, characterized in that the torque sensor is disposed on the driven shaft and the pressurizing valve is controlled as a function of the load present on the transmission in such a way that it throttles the discharge of pressure medium to a greater degree if the load is greater than if the load is smaller.

2. A transmission according to claim 1, characterized in that the pressurizing valve hydraulically precedes the torque sensor.

3. A transmission according to claim 1, characterized in that the adjustment of the pressurizing valve is effected against a resistance connected with the pressurizing valve, which resistance permits a greater adjustment speed for the pressurizing valve if there is an increase in load than if there is a decrease in load.

4. A transmission according to claim 3, characterized in that the resistance is a cylinder-piston unit whose movable component is rigidly connected with the piston of the pressurizing valve and which has a chamber filled with pressure medium, with the volume of said chamber being reduced if there is an increase in load in that it is emptied through a fixed throttle and a one-way valve that then opens and the volume being increased if there is a reduction in load in which case the chamber is filled only through the fixed throttle.

5. A transmission according to claim 4, characterized in that the emptying and filling is effected by way of at least one conduit at whose one end the pressure is the same as the pressure medium pressure at the outlet of the four-edged spool valve and at whose other end the one-way valve and/or the fixed throttle are disposed.

6. A transmission according to claim 1, characterized in that the load-dependent control of the pressurizing valve is effected by way of a cam mechanism that is connected with the gas pedal of an internal-combustion engine acting as the drive.

7. A transmission according to claim 1, characterized in that the control of the pressurizing valve is effected by means of an electronic control unit which generates a control instruction from data determined by means of sensors in the internal-combustion engine acting as the drive.

8. A transmission according to claim 7, characterized in that the electronic control unit includes a proportional valve and the pressurizing valve is actuated by a hydraulic pressure determined by the proportional valve.

9. A transmission according to claim 1, characterized in that the torque sensor is configured as a torque pump and bypass conduits equipped with check valves and leading to control valves that precede the torque sensor are disposed between the torque sensor and the cylinder-piston units, with pressure medium flowing from the torque sensor into the cylinder-piston units if there is a sudden increase in torque.

* * * * *